J. B. YOUNG.
THERMOMETER CASE.
APPLICATION FILED MAY 4, 1911.
1,031,901.
Patented July 9, 1912.
Fig-1-
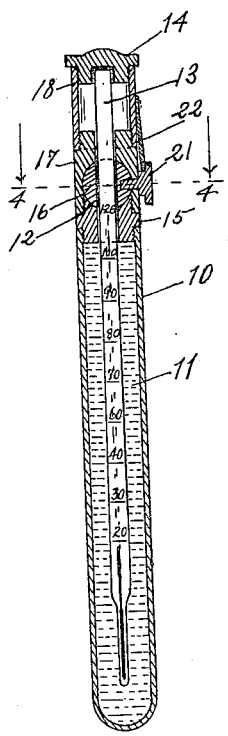
Fig-2-
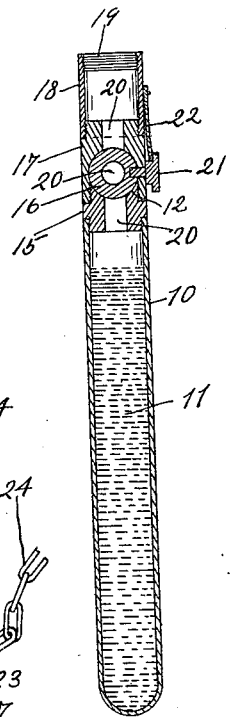
Fig-5-
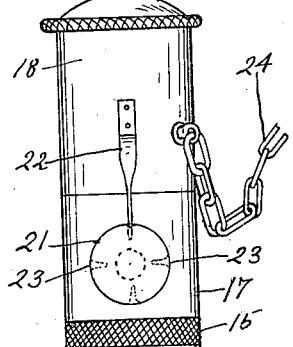
Fig-3-
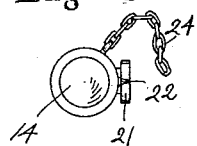
Fig-4-
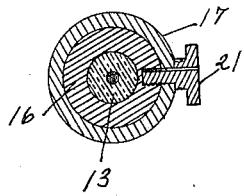
WITNESSES:
O. M. McLaughlin
J. H. Wills
INVENTOR.
James B. Young.
BY
V. H. Lockwood
ATTORNEY.

UNITED STATES PATENT OFFICE.

JAMES B. YOUNG, OF CUMBERLAND, INDIANA.

THERMOMETER-CASE.

1,031,901.     Specification of Letters Patent.     Patented July 9, 1912.

Application filed May 4, 1911. Serial No. 624,975.

*To all whom it may concern:*

Be it known that I, JAMES B. YOUNG, a citizen of the United States, and a resident of Cumberland, county of Marion, and State of Indiana, have invented a certain useful Thermometer-Case; and I do hereby declare that the following is a full, clear, and exact description thereof, reference being had to the accompanying drawings.

The object of this invention is to provide an improved casing for clinical thermometers so arranged so as to securely hold the thermometer in the casing against breakage and submerged in an antiseptic liquid and having a valve in said casing through which the thermometer may be inserted and which may be closed when the thermometer is drawn through the same for the purpose in view to prevent the escape of the antiseptic liquid.

The nature of the invention will be understood from the accompanying drawings and the following description and claims.

Figure 1 is a longitudinal section through the casing with the thermometer inserted in the same. Fig. 2 is a longitudinal section through the casing after the thermometer has been removed and the valve turned to prevent the escape of the antiseptic liquid. Fig. 3 is a plan view of Fig. 1. Fig. 4 is a section on the line 4—4 of Fig. 1. Fig. 5 is a side elevation of the top portion of the casing with the thermometer inserted.

In detail there is shown in the drawings a casing 10 adapted to hold an antiseptic liquid 11 in its lower portion and a valve mechanism 12 on its upper end so adapted that a thermometer 13 secured to a top piece or handle 14 may be inserted through said valve mechanism into the antiseptic liquid. The valve mechanism 12 has a lower portion 15 which screws into the thermometer casing 10 and on its upper side there is a semi-spherical concavity in which a ball valve 16 is secured and held in place by the portion 17 of the mechanism which screws onto the lower portion 15. A third tubular portion 18 is secured onto said portion 17 and has an internally threaded portion 19 at its upper end into which the knob 14 or holder of the thermometer may be secured. The portion 17, the ball valve 16 and the lower portion 15 have holes 20 through them of a diameter sufficient to allow the thermometer 13 to be inserted therethrough down into the antiseptic liquid, as shown in Fig. 1. The ball valve 16 is externally controlled by the small knob or projection 21 whereby it may be turned from an open to a closed position. A small spring 22 is adapted to engage in notches 23 on said knob and hold said valve in an open or a closed position, as described. A small chain 24 attached to the upper part 18 of the casing may be supplied with any sort of pin or catch, whereby the casing may be secured in a pocket or to the nurse's apron to prevent its escaping therefrom and holding it in an upright position.

I claim as my invention:

1. A clinical thermometer having a casing adapted to contain a fluid, and an externally operated valve near its outer end having a hole therethrough adapted to receive a thermometer when the valve is in one position and when the thermometer is removed said valve is adapted to be turned into a position to prevent the escape of the fluid.

2. A clinical thermometer having a casing adapted to contain a fluid, a valve seat within said casing near its outer end with a passageway therethrough for a thermometer, a cylindrical valve mounted on said valve seat with a passageway therethrough for a thermometer and which registers with the passageway through the valve seat, and means secured to said valve and extending outside of the casing whereby the valve is externally operated and moved, after the thermometer is removed, to a position which will prevent the escape of the fluid.

3. A clinical thermometer having a casing adapted to contain a fluid, a valve seat within said casing near its outer end with a passageway therethrough for a thermometer, a cylindrical valve mounted on said valve seat with a passageway therethrough for a thermometer and which registers with the passageway through the valve seat, means secured to said valve and extending outside of the casing whereby the valve is externally operated and moved, after the thermometer is removed, to a position which will prevent the escape of the fluid, and means secured to the outside of the casing for locking said valve actuating means in position.

In witness whereof, I have hereunto affixed my signature in the presence of the witnesses herein named.

JAMES B. YOUNG.

Witnesses:
G. H. BOINK,
O. M. McLAUGHLIN.

Copies of this patent may be obtained for five cents each, by addressing the "Commissioner of Patents, Washington, D. C."